June 24, 1952
A. L. WEAVER
2,601,574
LAWN MOWER SHARPENING MACHINE
Filed Aug. 2, 1948
4 Sheets-Sheet 1
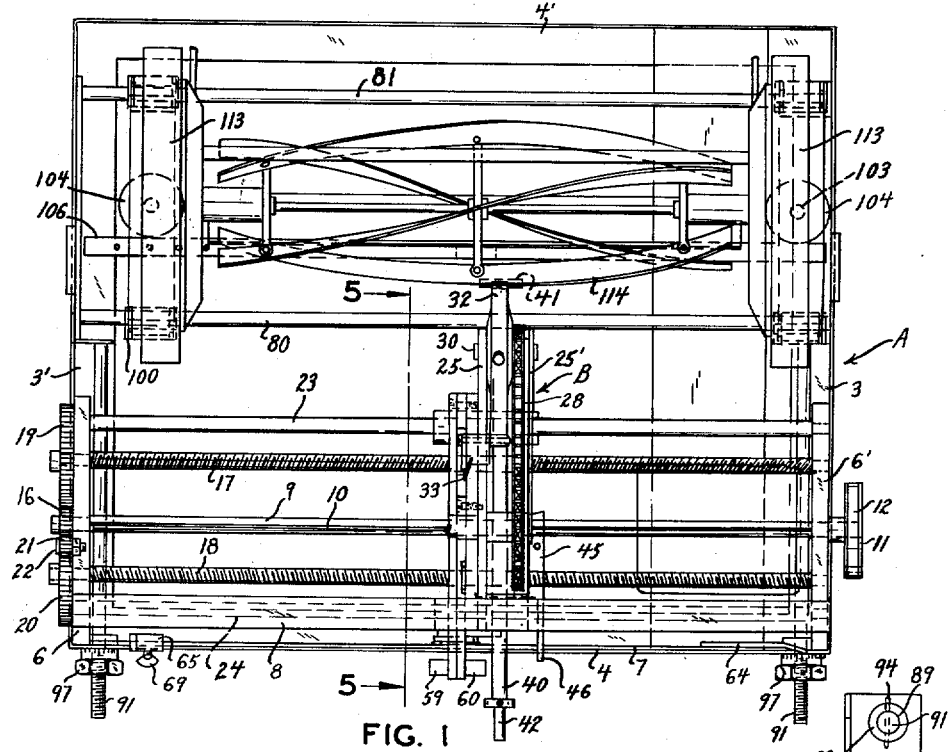
FIG. 1
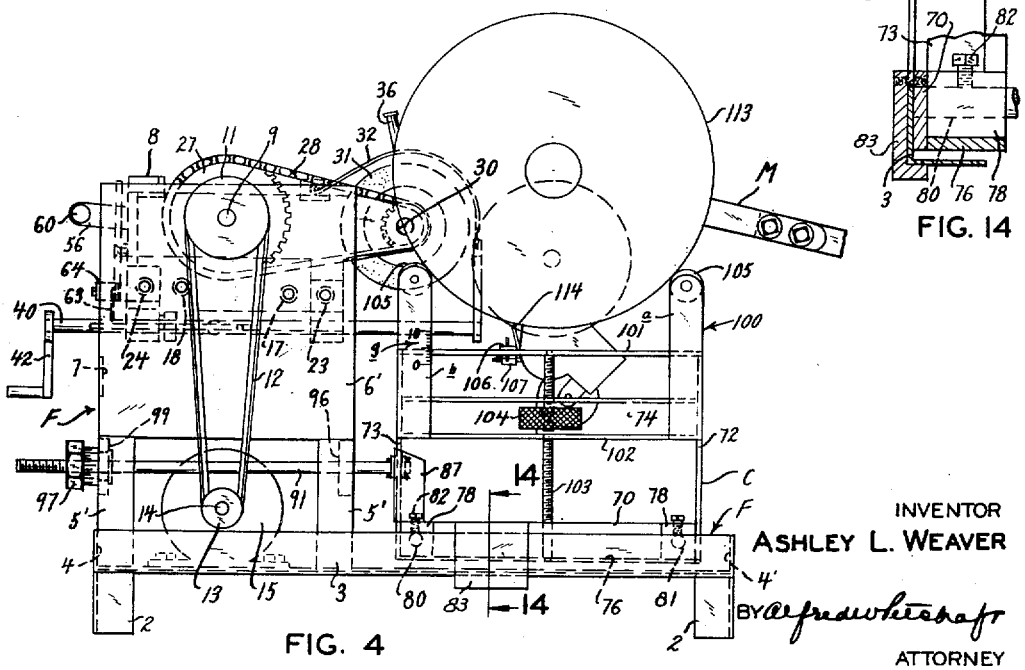
FIG. 4
FIG. 14
INVENTOR
ASHLEY L. WEAVER
BY Alfred Wheehaft
ATTORNEY

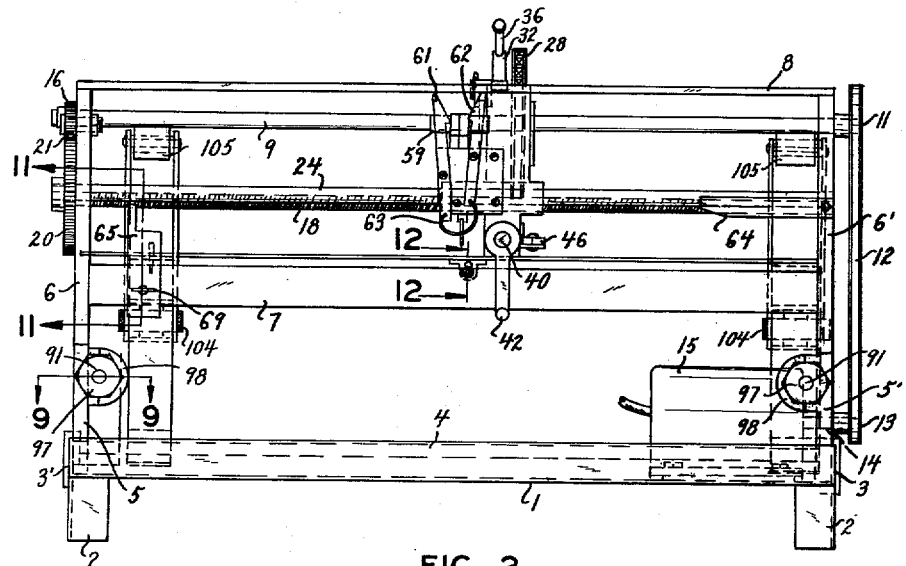
FIG. 2
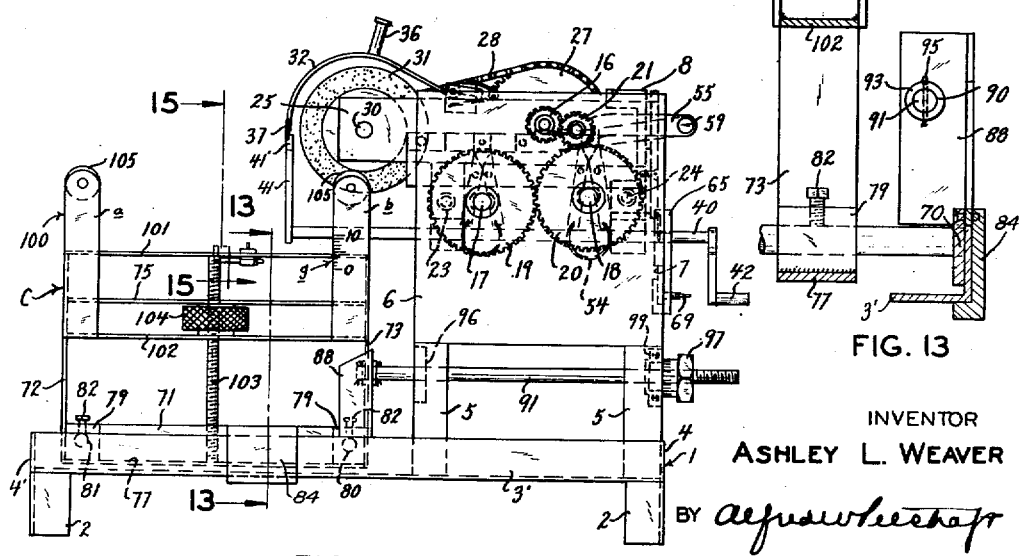
FIG. 3
FIG. 13
INVENTOR
ASHLEY L. WEAVER
BY
ATTORNEY

June 24, 1952  A. L. WEAVER  2,601,574
LAWN MOWER SHARPENING MACHINE
Filed Aug. 2, 1948  4 Sheets-Sheet 3

INVENTOR
ASHLEY L. WEAVER
BY *Alfred W Petchaft*
ATTORNEY

June 24, 1952  A. L. WEAVER  2,601,574
LAWN MOWER SHARPENING MACHINE
Filed Aug. 2, 1948  4 Sheets-Sheet 4

INVENTOR
ASHLEY L. WEAVER
BY
ATTORNEY

Patented June 24, 1952

2,601,574

UNITED STATES PATENT OFFICE 2,601,574

LAWN MOWER SHARPENING MACHINE

Ashley L. Weaver, Maplewood, Mo., assignor, by decree of distribution, to Edith Weaver Application August 2, 1948, Serial No. 41,927

6 Claims. (Cl. 51—48)

This invention relates in general to grinders and, more particularly, to a grinder for sharpening the blades of a lawn mower.

The primary object of the present invention is to provide a lawn mower sharpening machine which is simple, rapid, and substantially automatic in operation, which may be constructed at comparatively low cost, and which is universally adaptable to all sizes, types, and kinds of conventional lawn mowers.

Another object of the present invention is to provide a lawn mower sharpening machine which accomplishes an even sharpening by means of a grinding wheel which is translated automatically at a steady rate along the margins of the blades as presented.

A further object of the present invention is to provide a lawn mower sharpening machine provided with an adjustable cradle for accommodating lawn mowers of various sizes against displacement during the sharpening action.

An additional object of the present invention is to provide a lawn mower sharpening machine provided with a blade rest having an angularly disposed upper face for feeding the spiral shaped rotatable blades of a lawn mower into the grinding wheel for sharpening operation thereon as the grinding wheel is automatically translated from one side of the machine to the other.

An additional object of the present invention is to provide a lawn mower sharpening machine which can be simply set up to sharpen the blades to any degree and with any desired amount of rake or back clearance, and which uniquely achieves a hollow ground edge on the blades being sharpened.

With the above and other objects in view, my invention resides in the novel features of form, construction, arrangement, and combination of parts presently described and pointed out in the claims.

In the accompanying drawings:

Figure 1 is a top view of a lawn mower sharpening machine constructed in accordance with and embodying the present invention;

Figure 2 is a front elevational view;

Figures 3 and 4 are, respectively, opposite side elevational views;

Figure 5:
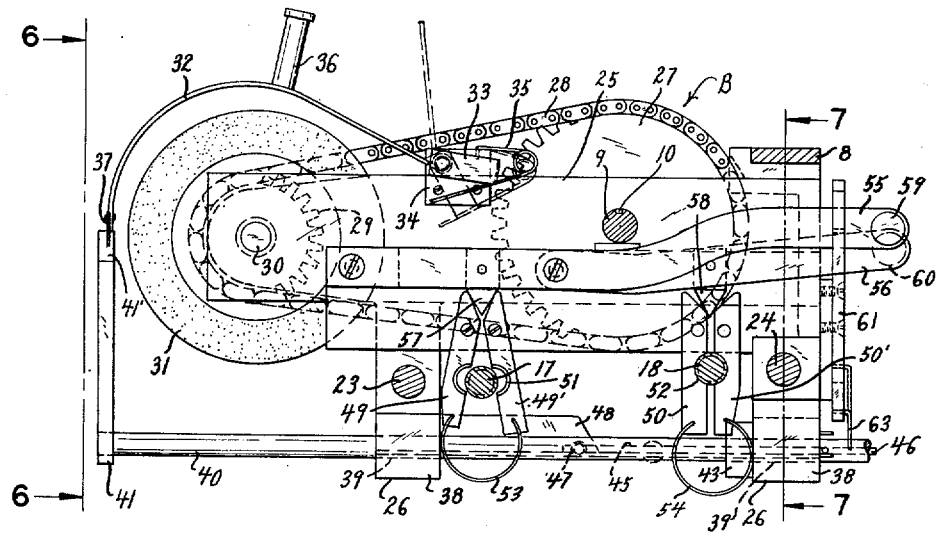
Figure 5 is a transverse sectional view taken along line 5—5 of Figure 1.
Figure 6:
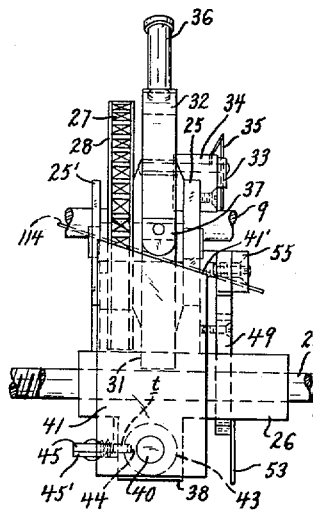
Figure 7:
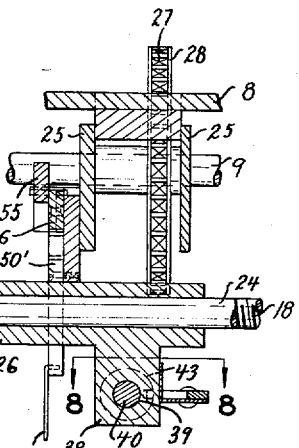
Figure 8:
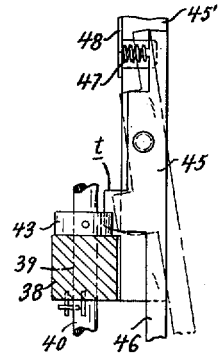
Figure 11:
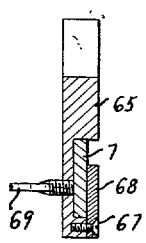
Figures 10, 12:
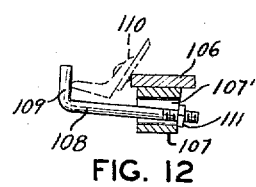
Figure 9:
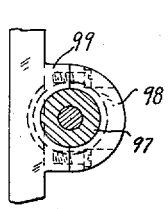
Figure 15:
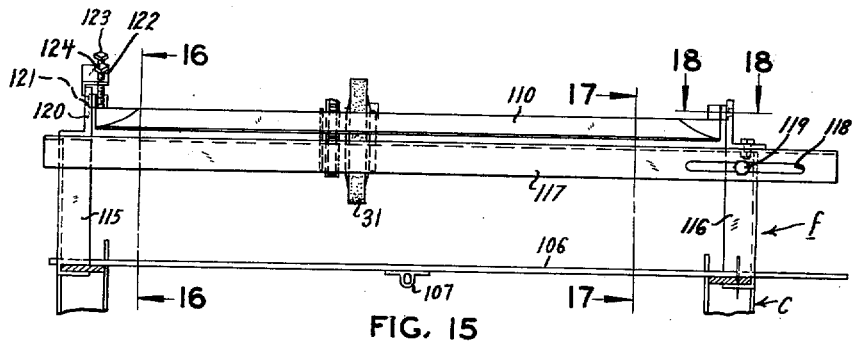
Figure 16:
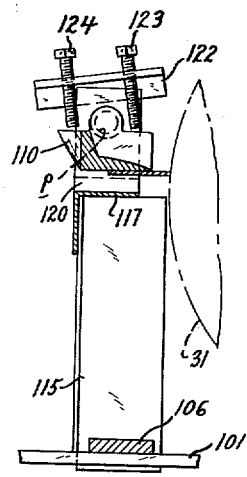
Figure 17:
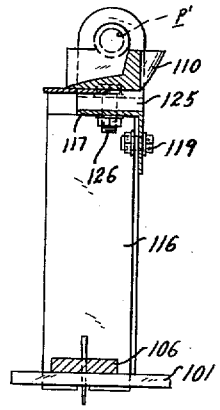
Figure 18:
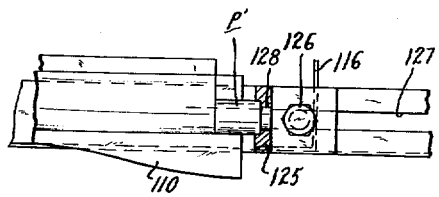
Figure 19:
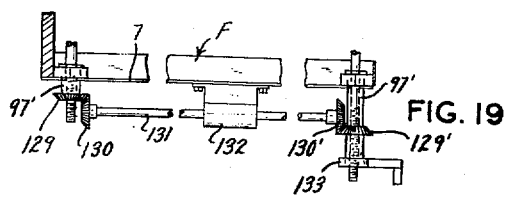

Figures 6 and 7 are transverse sectional views taken along lines 6—6 and 7—7, respectively, of Figure 5;

Figure 8 is a transverse sectional view taken along line 8—8 of Figure 7;

Figure 9 is a transverse sectional view taken along line 9—9 of Figure 2;

Figure 10 is a transverse sectional view taken along line 10—10 of Figure 9;

Figures 11 and 12 are transverse sectional views taken along lines 11—11 and 12—12, respectively, of Figure 2;

Figure 13 is a transverse sectional view taken along line 13—13 of Figure 3;

Figure 14 is a transverse sectional view taken along line 14—14 of Figure 4;

Figure 15 is a transverse sectional view taken along line 15—15 of Figure 3;

Figures 16, 17, and 18 are transverse sectional views taken along lines 16—16, 17—17, and 18—18, respectively, of Figure 15; and Figure 19 is a fragmentary horizontal sectional view of a modified form of cradle adjusting mechanism forming a part of the present invention.

Referring now in more detail and by reference characters to the drawings which illustrate a preferred embodiment of the present invention. A designates a lawn mower sharpening machine comprising a main frame F, a grinder carriage B mounted in the frame for transverse reciprocation or translative movement, and a cradle or lawn mower holding device C adjustably mounted in the frame for positioning the mower blades in proper relation to the grinder carriage B.

The main frame F comprises a rectangular base 1 having upstanding corner legs 2 and cross members 3, 3', 4, 4', all preferably formed of angle sections and designed to rest on a table or other suitable support (not shown). Mounted on the main frame F are spaced upstanding parallel legs 5, 5', secured at their lower ends by bolts to the cross members 3, 3', and provided at their upper ends with end plates 6, 6', respectively, and transversely connected by horizontal brace members 7, 8. Extending through said plates 6, 6', and journalled therein is a transverse shaft 9 provided with an axial keyway 10. The shaft 9 is provided on one end with a driving pulley 11 connected by a V-belt 12 to a sheave 13 keyed or otherwise suitably fixed upon the shaft 14 of a conventional electric motor 15. The opposite end of the shaft 9 is provided with a spur gear 16 suitably mounted for rotation therewith.

Also journalled in the plates 6, 6', and extending at one end through the plate 6, are spaced horizontal lead screws 17, 18, disposed below the shaft 9 and forwardly and rearwardly, respectively, thereof. On their extended end, the screws 17, 18, are provided with relatively large spur gears 19, 20, respectively. The gear 20 engages an idler gear 21 suitably mounted on the end of a stub shaft 22 journalled in the plate 6. The idler gear 21 also meshes with the spur gear 16, whereby through the gear train comprised of the gears 16, 19, 20, and 21, the lead screws 17, 18, may be rotated upon rotation of the shaft 9. Secured also at their ends in the plates 6, 6', and extending therebetween, are spaced horizontal slide rods 23, 24.

Slidably mounted in the rods 23, 24, for translative movement therealong is the grinder carriage B comprising vertical frame plates 25, 25', rigidly secured together in spaced parallel relation to each other and to the plate 6, 6', and supported by slide blocks 26 shiftably mounted in the slide rods 23, 24. Splined upon the shaft 9 and rotatably driven thereby is a main driving sprocket 27 journalled in and mounted between the plates 25, 25', for translative movement along the shaft 9 with the carriage B. The sprocket 27 is connected by a sprocket chain 28 to a forwardly disposed and relatively smaller sprocket 29 pinned or otherwise rigidly mounted on the outwardly extending end of a stub shaft 30 journalled at its ends in, and extending horizontally between, the plates 25, 25'. Suitably fixed upon the stub shaft 30 between the plates 25, 25', is a grinding wheel 31.

A guard member 32 extending in outwardly spaced peripheral relation over the upper and forward margins of the grinding wheel 31 is connected at its inner end to a toggle plate 33 which is pivotally mounted on a base 34 which is, in turn, fastened to the plate 25. Co-operating with the toggle plate 33 is a spring member 35, by the co-action of which the guard member 32 may be optionally raised for purposes more fully appearing hereinafter, by manual operation of a handle 36 upstandingly provided thereon. Secured by a rivet to the outer end of said guard 32 is a depending holding plate 37.

Integral with the slide blocks 26 are depending bosses 38 having axially aligned horizontal bores 39 perpendicular to the axis of the slide rods 23, 24, for receiving and supporting a rock-shaft 40 provided on its outer end with a radially extending stop plate or blade rest 41 having an oblique upper face 41' and being disposed substantially in the vertical plane of the holding plate 37 when the latter is in blade-engaging position, as shown in Figure 5, for example. The opposite end of the rock-shaft 40 extends beyond the frame 1 and is provided on such extended end with a handle 42 for manual operation thereof. Secured upon the rock-shaft 40 adjacent the boss 38 is a collar 43, having a peripheral slot 44, and, adjacent the collar 43, is a locking member 45 pivotally mounted on a supporting flange 45' secured to the boss 26, as shown in Figure 8. Formed integrally with the member 45 is a tongue t for locking engagement in the slot 44, and an operating handle 46 projecting rearwardly therefrom beyond the cradle so as to be accessible for manual operation. One end of the locking member 45 is engaged by one end of a coil spring 47 which is secured at its other end to a lip 48 on the flange 45'.

Suitably mounted, as by screws, on the plate 25 and depending therefrom, are two sets of spaced spring acting dogs 49, 49', and 50, 50', of the "split-nut" type, respectively disposed around the lead screws 17, 18. The dogs of each set are provided with corresponding arcuate threaded recesses 51, 52, for threaded clamping engagement, respectively, with the screws 17, 18. The upper ends of each set of dogs 49, 49', and 50, 50', incline inwardly and the lower ends are connected by hairpin springs 53, 54, respectively. Swingably mounted on said plate 25 above the dogs 49, 49', and 50, 50', are parallel actuating levers 55, 56, each of which carries a depending V-shaped camming block projection 57, 58, respectively, designed to move between the upper inwardly inclining ends of the dogs 49, 49', and 50, 50', when said levers 55, 56, are manually swung downwardly by handle means 59, 60, respectively, provided on the extended end of said levers 55, 56, whereby the set of dogs 49, 49', and 50, 50', are closed in clamping disposition about the lead screws 17, 18, respectively. It will, of course, be understood in this connection that either one or the other set of dogs will be engaged to shift the grinder carriage to the right or left, as may be required.

Mounted on the outer end of the carriage B are detents or catches 61, 62, being biased at their lower ends by a spring member 63 and being positioned to engage and hold down the levers 55, 56, respectively.

Secured to one margin of the plate 6' and projecting inwardly is an elongated disengaging arm 64 for releasing the detent 62 from engagement with the lever 56, as will appear more fully hereinafter.

Opposite to the arm 64, and in the same plane therewith, is a second disengaging arm 65 disposed slidably on the brace member 7 whereby said arm 65 may be horizontally adjusted to limit the length of travel of the carriage B, as will be shown more fully hereinafter. Secured by a bolt 67 to the lower margin of the arm 65 is a relatively short upstanding retention plate 68. A locking screw 69 extends through an aperture in the arm 65 for abutment at its inner end against the brace member 7 in order to hold the arm 65 in any selected position thereon.

The cradle C comprises rectangular frame members 70, 71, disposed forwardly of the plates 6, 6', respectively. Each of the frame members 70, 71, contain a pair of upstanding legs 72, 73, connected by upper cross members 74, 75, and lower cross members 76, 77. Each of the lower cross members 76, 77, is provided, adjacent the legs 72, 73, with bearing blocks 78, 79, for extension therethrough of rods 80, 81, extending transversely between the frame members 70, 71. Set screws 82 extend through said bearing blocks 78, 79, for locking engagement with the rods 80, 81, the ends of which are secured in plates 83, 84, parallel and adjacent to the cross members 3, 3', respectively, whereby the cradle C may be moved slidingly along the cross members 3, 3'. It should be noted in this connection that by releasing the set screws 82 the legs 72, 73, can be adjusted toward and away from each other within limits to accommodate lawn mowers of various widths.

Secured to the inwardly extended end of the plates 83, 84, are upstanding angle sections 87, 88, respectively, each provided with apertures 89, 90, for receiving the ends of adjustment rods 91, which are operably connected to the sections 87, 88, by having washers 92, 93, on either side of said sections 87, 88, and cotter pins 94, 95, outwardly of said washers 92, 93, respectively. Said adjustment rods 91 extend horizontally through the machine A, being supported by bearings 96 mounted suitably on the legs 5 of the structure, and internally threaded adjustment collars 97 mounted rotatably in the forward legs 5, 5', by means of bearing caps 98 secured by screws to the cooperating bearing members 99 on the legs 5, 5', respectively.

The extending portions of the adjustment rods 91 are threaded for engagement within the adjustment collars 97 which may be turned manually to shift the rods 91 and the cradle C toward or away from the grinder carriage B.

Slidably mounted on the legs 72, 73, of each frame member 70, 71, is an upstanding cradle arm 100 comprised of spaced metallic strips a, b, connected in their lower portions by transverse braces 101, 102, which are disposed above and below the upper cross members 74, 75, of the frame members 70, 71. Elevating screws 103 secured at their lower end in the cross members 76, 77, respectively, extend through suitable apertures in the braces 101, 102, and the cross members 74, 75, intermediate their ends. Adjustable hand nuts 104 are threaded on said screws 103 between the braces 102 and the cross members 74, 75, whereby the cradle arms 100 may be adjustably raised and lowered. Extending between, and journalled at their ends in, the upper ends of the strips a, b, are roller elements 105. Suitable graduation or markings g are provided on the exposed face of the cradle arms 100 whereby level adjustment may be accomplished.

Secured at its end to, and extending horizontally between, the braces 101 is a cross bar 106 centrally provided with a depending boss 107 having an aperture 107' and disposed loosely therethrough is a gripping member 108 provided with an upwardly hooked end 109 for retentive engagement with the sickle bar 110 of the lawn mower M. Said member 108 is threaded at its inner end and provided with a nut 111 so that the hooked end 109 may be drawn down tightly against the sickle bar 110.

In operation, a lawn mower M of the conventional type is placed on the cradle C with the wheels 113 thereof disposed on the rollers 105 of the cradle arms 100, the integral parts of the cradle C having been adjusted to accommodate the particular size of the lawn mower M as follows: The adjustment rods 91 are manipulated to so position the cradle C longitudinally within the frame 1 so that the margins of the spiral blades 114 of the mower will bear against the grinding wheel 31 when rotated. The frames 70, 71, are correspondingly slidably moved along the rods 80, 81, and locked in selected position by the set screws 82, so that the rollers 105 of the arms 100 will then accommodate the wheels 113, the cradle arms 100 are vertically adjusted for proper horizontal alignment by manipulation of the hand nut 104, the sickle bar 110 of the mower M depends downwardly in the cradle C and is retentively engaged by the hooked end 109 of the gripping member 108 against displacement. The rock shaft 40 is manually rotated so that the blade rest 41 is in upstanding position and held therein by operation of the locking member 45. The first blade 114 of the mower M to be sharpened will be placed abuttingly on the upper edge of the blade rest 41. The guard member 32 is pulled downwardly so that the holding plate 37 will rest on top of the blade 114 and retain it in position for operation thereon by the grinding wheel 31. The motor 15 is then energized, thereby rotating the shaft 9, which rotation is transmitted through the gear train comprising gears 16, 19, 20, and 21, as above-mentioned, to the lead screws 17, 18. Depending upon which side of the machine A the carriage B is momentarily located, one of the levers 55, 56, is pulled downwardly, whereon the respective camming projection 57 or 58 will engage the corresponding pair of dogs 49, 49', or 50, 50', so that the respective lead screw 17 or 18 is clampingly engaged. It is to be particularly noted that both sets of dogs should not be placed into clamping position at the same time, but if, accidentally, both of the levers 55, 56, are moved into downward position at the same time, the pairs of dogs 49, 49', and 50, 50', will "buck" each other so to speak, and the hairpin spring will permit them to snap or jump rapidly into and out of engagement, thereby preventing stripping of the threads. Upon said clamping of the lead screws 17 or 18, as the case may be, the carriage B is translated along the shaft 9 and slide rods 23, 24, in the direction of rotation of the particular lead screw 17 or 18, by the threading action thereof. It is to be noted that said screws 17, 18, rotate in opposite directions. As the main sprocket 27 is rotated by the shaft 9, rotation is transmitted through the sprocket chain 28 and the sprocket 29 to the stub shaft 30 and the grinding wheel 31. As the carriage B translates in the selected direction, the grinding wheel 31 sharpens the blade 114 which is held between the blade rest 41 and the holding plate 37. The angularity of the upper end of the blade rest 41 provides a convenient surface for the spiral blades 114 of the lawn mower M as the blade rest 41 translates with the carriage B, the length of travel in either direction of the carriage B being determined by the disengaging arms 64, 65, which disengagingly abut against the lower ends of the detents 62, 61, respectively, by causing the upper end of said detents to be pivoted outwardly, thereby releasing the particular lever 55 or 56, which is in "down" position. The length of the blades 114 of the lawn mower M determines whether the adjustable arm 65 should be moved so as to shorten or lengthen the distance of travel of the carriage B. When the carriage B has moved to one end of its travel, the other lever 55 or 56, as the case may be, is manually moved into "down" position and held therein by its corresponding detents 61 or 62, whereon, since the opposite pair of dogs is moved into clamping engagement with the particular lead screw 17 or 18, the carriage B will move in the opposite direction. Ordinarily, after each traverse by the carriage B, the guard 32 should be raised so that another blade 114 of the lawn mower M may be placed in position for sharpening. This is accomplished by disengaging the locking member 45, whereby the rock shaft 40 may be manually rotated to swing the blade rest 41, whereby the sharpened blade 114 may be rotated out of position. The blade rest 41 is then swung upwardly and by operation of the locking member is secured in upright position whereon the succeeding blade 114 of the mower M is manually moved into position on the upper face of said blade rest 41. It has been found that better results may be obtained by subjecting each blade to a single pass of the wheel 31. If one or more of the blades 114 are deeply nicked, the operation may be repeated for several successive series of passes, shifting the cradle C forwardly an additional amount between each such series of passes.

For sharpening the sickle bar of lawn mowers, a sickle bar sharpening fixture f is provided preferably comprising a pair of vertical upright members 115, 116 formed preferably of angle iron or similar material and adapted to be bolted or otherwise suitably mounted for optional installation and removal upon the cradle C, as shown in Figure 15. Rigidly mounted at one end to the upper end of the upright member 115, and extending horizontally across the cradle C, is a beam 117 provided at its opposite end with a lengthwise extending slot 118 for adjustable securement by means of a bolt 119 to the upper end of the other upright member 116. Rigidly mounted upon the beam adjacent the upright member 115 is a vertical trunnion 120 provided with a horizontally inwardly extending trunnion hole 121, and upon its upper end face with an inwardly flanged cap bar 122 having two angularly downwardly projecting set screws 123, 124. Mounted upon the other end of the beam for adjustment toward and away from the trunnion 120, by means of a bolt 126 extending through a slot 127, is a second trunnion 125 provided merely with an inwardly extending horizontal trunnion hole 128. In use, the sickle bar 110 is bodily removed from the lawn mower and the fixture f adjusted as to length to accommodate it. The swivel pins p, p', of the sickle bar 110 are inserted in the trunnions 120, 125, and the set screws 123, 124, threaded down upon the upper margins at one end of the sickle bar 110 for tilting it into substantially precise horizontal position. The cradle C is then adjusted forwardly or rearwardly so that the edge of the sickle bar 110 will be brought into contact with the grinding wheel 31. Thereupon, the machine is set in operation in the same manner as previously described, and the grinding wheel will traverse horizontally across the cutting edge of the sickle bar 110, speedily and quickly sharpening the latter.

It should be noted that in connection with the sharpening of lawn mower blades and sickle bars the particular portion of the surface being ground can be presented to the grinding wheel 31 in more or less the same horizontal plane as the axis of rotation of the grinding wheel 31, so that the ground edge is arcuately relieved inwardly from the cutting edge to achieve a sort of "hollow ground" effect. Such hollow ground cutting edges are much keener and retain their sharpness over much longer periods of use than straight ground edges and, furthermore, tend to be self-sharpening in use.

If desired, it is possible to provide a modified form of cradle positioning mechanism, as shown in Figure 19, in which threaded adjustment collars 97' are provided which are substantially similar to the threaded adjustment collars 97 previously described except that instead of the manually manipulable knurled knobs the adjustment collars 97' are integrally provided with beveled gears 129, 129', respectively, facing in opposite directions and meshing with oppositely presented bevel gears 130, 130', pinned or otherwise suitably secured upon a transverse idle shaft 131 which is, in turn, conventionally bearinged in a support casting 132 welded or otherwise rigidly mounted upon the cross member 7 of the main frame F. Preferably, though not necessarily, the outwardly presented end face of the bevel gear 129' is provided with a conventional type of crank handle 133. It will thus be evident that by turning the crank handle 133 both of the bevel gears 129, 129' and the associated adjustment collars 97' will be rotated simultaneously and in the same direction so that the forward and rearward adjustment of the cradle C can be effected in a very speedy and simple manner.

It should be understood that changes and modifications in the form, construction, arrangement, and combination of the several parts of the grinder may be made and substituted for those herein shown and described without departing from the nature and principle of my invention.

Having thus described my invention, what I claim and desire to secure by Letters Patent is:

1. In a lawn mower sharpening machine, a base frame having transversely extending slides, a grinder carriage shiftably mounted on said slides for to-and-fro movement transversely across said frame, a cradle having a pair of laterally spaced side frames, means for adjustably shifting said side frames toward and away from each other, each side frame having a pair of spaced upstanding legs, a bracket having spaced side portions mounted upon the upper ends of said pair of legs, a pair of upwardly presented spaced parallel rollers mounted in each bracket for supporting the wheels of a lawn mower, while allowing said wheels and the associated rotary cutter element of the lawn mower to rotate substantially freely, and means for holding the lawn mower in such supported position within the cradle.

2. In a lawn mower sharpening machine, a base frame having transversely extending slides, a grinder carriage shiftably mounted on said slides for to-and-fro movement transversely across said frame, a cradle having a pair of laterally spaced side frames, each side frame having a pair of spaced upstanding legs, a bracket having spaced side portions mounted upon the upper ends of said pair of legs, a pair of upwardly presented spaced parallel rollers mounted in each bracket for supporting the wheels of a lawn mower while allowing said wheels and the associated rotary cutter element of the lawn mower to rotate substantially freely, and means for holding the lawn mower in such supported position within the cradle.

3. In a lawn mower sharpening machine, a base frame having transversely extending slides, a grinder carriage shiftably mounted on said slides for to-and-fro movement transversely across said frame, a pair of spaced parallel lead screws journalled at their ends in the frame and extending in a direction parallel to the path of movement of the carriage, means for simultaneously rotating said screws in opposite directions to each other, two pair of split nuts spacedly mounted on said carriage, a spring connecting the lower ends of each pair of split nuts, the upper ends of said nuts being inwardly inclined, one pair of nuts being positioned for engagement with one lead screw and the other pair being positioned for engagement with the other lead screw, and camming means for optionally locking one of said pair of split nuts into engagement with the associated lead screw whereby to cause said carriage to move transversely across the frame.

4. In a lawn mower sharpening machine, a base frame having transversely extending slides, a grinder carriage shiftably mounted on said slides for to-and-fro movement transversely across said frame, a pair of spaced parallel lead screws journalled at their ends in the frame and extending in a direction parallel to the path of movement of the carriage, means for simultaneously rotating said screws in opposite directions to each other, two pair of split nuts spacedly mounted on said carriage, a spring connecting the lower ends of each pair of split nuts, the upper ends of said nuts being inwardly inclined, one pair of nuts being positioned for engagement with one lead screw and the other pair being positioned for engagement with the other lead screw, levers swingably mounted upon said carriage, and a V-shaped camming block mounted upon the end of each lever for optionally locking one of said pairs of split nuts into engagement with the associated lead screw whereby to cause said carriage to move transversely across the frame.

5. In a lawn mower sharpening machine, a base frame having transversely extending slides, a grinder carriage shiftably mounted on said slides for to-and-fro movement transversely across said frame, a cradle having a pair of laterally spaced side frames, each of said side frames having a pair of spaced upstanding legs, a strip member adjustably mounted on the upper end of each of said legs, an upwardly presented roller element mounted on each of said strips for supporting the wheels of a lawn mower while allowing said wheels and the associated rotary cutter element of the lawn mower to rotate substantially freely, and means for holding the lawn mower in such supported position within the cradle.

6. In a lawn mower sharpening machine, a base frame having transversely extending slides, a grinder carriage shiftably mounted on said slides for to-and-fro movement transversely across said frame, a cradle having a pair of laterally spaced side frames, each of said side frames having a pair of spaced upstanding legs, a strip member adjustably mounted on the upper end of each of said legs, an upwardly presented roller element mounted on each of said strips for supporting the wheels of a lawn mower while allowing said wheels and the associated rotary cutter element of the lawn mower to rotate substantially freely, and a gripping member having an upwardly hooked end for retentively holding the lawn mower in such supported position within the cradle.

ASHLEY L. WEAVER.

REFERENCES CITED

The following references are of record in the file of this patent:

UNITED STATES PATENTS

| Number | Name | Date |
|---|---|---|
| 288,497 | Schultz | Nov. 13, 1883 |
| 492,095 | Medart | Feb. 21, 1893 |
| 661,693 | Hazelhurst | Nov. 13, 1900 |
| 850,374 | King | Apr. 16, 1907 |
| 893,302 | Blanch et al. | July 14, 1908 |
| 1,268,048 | Norman | May 28, 1918 |
| 1,276,810 | Ragan | Aug. 27, 1918 |
| 1,409,641 | Anderson | Mar. 14, 1922 |
| 1,448,518 | Brown | Mar. 13, 1922 |
| 1,657,757 | Krenz | Jan. 31, 1928 |
| 1,807,934 | Ross | June 2, 1931 |
| 1,967,118 | Glasgow | July 17, 1934 |
| 1,967,964 | Miller | July 24, 1934 |
| 2,149,774 | Ingleman | Mar. 7, 1939 |
| 2,281,055 | Smith | Apr. 28, 1942 |

FOREIGN PATENTS

| Number | Country | Date |
|---|---|---|
| 6,699 | Australia | Mar. 29, 1932 |